(12) United States Patent
Eckle

(10) Patent No.: US 10,822,004 B2
(45) Date of Patent: Nov. 3, 2020

(54) DATA TRANSMISSION DEVICE, CONDUCTOR RAIL AND CONDUCTOR RAIL SYSTEM

(71) Applicant: Conductix-Wampfler GmbH, Weil am Rhein (DE)

(72) Inventor: Michael Eckle, Müllheim (DE)

(73) Assignee: CONDUCTIX-WAMPFLER GMBH, Weil am Rhein (DE)

( * ) Notice: Subject to any disclaimer, the term of this patent is extended or adjusted under 35 U.S.C. 154(b) by 345 days.

(21) Appl. No.: 15/552,934

(22) PCT Filed: Mar. 9, 2017

(86) PCT No.: PCT/EP2017/055586
§ 371 (c)(1),
(2) Date: Aug. 23, 2017

(87) PCT Pub. No.: WO2017/190877
PCT Pub. Date: Nov. 9, 2017

(65) Prior Publication Data
US 2018/0170411 A1    Jun. 21, 2018

(30) Foreign Application Priority Data

May 6, 2016    (DE) .................. 10 2016 108 442

(51) Int. Cl.
*B61L 3/22*          (2006.01)
*H01Q 1/32*          (2006.01)
(Continued)

(52) U.S. Cl.
CPC .............. *B61L 3/227* (2013.01); *B60L 5/005* (2013.01); *H01P 3/123* (2013.01); *H01Q 1/3225* (2013.01);
(Continued)

(58) Field of Classification Search
CPC .. B61L 3/18; B61L 3/185; B61L 3/227; B60L 5/005; B60L 5/40; B60M 1/34
(Continued)

(56) References Cited

U.S. PATENT DOCUMENTS

| 413,294 | A | * | 10/1889 | Thomson | ................. B60M 1/34 |
| | | | | | 191/25 |
| 434,410 | A | * | 8/1890 | Van Depoele | ........... B60M 1/34 |
| | | | | | 191/25 |

(Continued)

FOREIGN PATENT DOCUMENTS

| CN | 103292705 A | 9/2013 |
| DE | 2555909 A1 | 6/1977 |

(Continued)

OTHER PUBLICATIONS

English translation of International Search Report dated May 16, 2017 for International Application No. PCT/EP2017/055586 filed Mar. 9, 2017.

(Continued)

*Primary Examiner* — Zachary L Kuhfuss
(74) *Attorney, Agent, or Firm* — Paul D. Bianco; Katharine Davis Wong; Fleit Intellectual Property Law

(57) ABSTRACT

A data transmission device has an elongated hollow profile with a hollow space extending in a longitudinal direction of the hollow profile, with the hollow profile having a longitudinal slot extending in the longitudinal direction for a transmission unit which moves relative to the hollow space at least in the longitudinal direction and which extends at least partially into the longitudinal slot. At least one sealing element extending along the hollow profile for sealing off at least one portion of the hollow space is provided. A conductor rail system includes a conductor rail for supplying at least one electrical load with electrical power, which load can be moved in the longitudinal direction along the con- (Continued)

ductor rail, with at least one conductor strand extending in the longitudinal direction with an electrically conducting conductor profile for contacting a sliding contact of the load and with at least one data transmission device extending in the longitudinal direction.

18 Claims, 3 Drawing Sheets

(51) Int. Cl.
  *H01P 3/123* (2006.01)
  *B60L 5/00* (2006.01)
  *H01Q 1/42* (2006.01)
  *B60L 5/40* (2006.01)
  *H01Q 13/22* (2006.01)

(52) U.S. Cl.
  CPC ........... *B60L 5/40* (2013.01); *B61L 2003/228* (2013.01); *H01Q 1/427* (2013.01); *H01Q 13/22* (2013.01)

(58) Field of Classification Search
  USPC .................................................... 191/25, 31
  See application file for complete search history.

(56) References Cited

U.S. PATENT DOCUMENTS

| | | | | |
|---|---|---|---|---|
| 448,838 | A * | 3/1891 | Pocock | B60M 1/34 191/25 |
| 540,187 | A * | 5/1895 | Petersen | B60M 1/34 191/25 |
| 1,010,504 | A * | 12/1911 | Lindsley | B60L 5/40 191/31 |
| 1,048,668 | A * | 12/1912 | Evans | B60M 1/04 191/30 |
| 2,151,099 | A * | 3/1939 | Groendyk | B60M 1/04 191/35 |
| 3,439,131 | A * | 4/1969 | Ross, Jr. | B60M 1/34 191/25 |
| 4,050,555 | A * | 9/1977 | Ross, Jr. | B60M 1/34 191/23 A |
| 4,083,439 | A * | 4/1978 | Chandler | B60L 5/40 191/31 |
| 4,245,727 | A * | 1/1981 | Pentith | B60M 1/34 191/25 |
| 4,580,346 | A * | 4/1986 | Reichl | G01D 5/264 277/345 |
| 4,888,454 | A * | 12/1989 | v. Scarpatetti | B60M 1/34 191/30 |
| 4,982,508 | A * | 1/1991 | Nelle | G01B 5/0014 33/702 |
| 5,258,931 | A * | 11/1993 | Hassler, Jr. | G01D 5/366 250/252.1 |
| 7,596,880 | B2 * | 10/2009 | Martin | G01D 5/34769 250/237 G |
| 8,419,450 | B2 * | 4/2013 | Schmiedle | H01R 41/00 439/110 |
| 8,997,367 | B2 * | 4/2015 | Schmoller | G01D 5/34761 33/706 |
| 9,234,734 | B2 * | 1/2016 | Schmoller | G01B 5/02 |
| 9,987,948 | B2 * | 6/2018 | Maier | B61L 3/227 |
| 10,137,801 | B2 * | 11/2018 | Eckle | H01B 5/08 |
| 2013/0227852 | A1 | 9/2013 | Schmoller | |
| 2016/0137101 | A1 * | 5/2016 | Eckle | H01B 5/08 191/23 R |
| 2017/0217333 | A1 * | 8/2017 | Maier | B61L 3/227 |
| 2018/0170411 | A1 * | 6/2018 | Eckle | B60L 5/005 |
| 2019/0222314 | A1 * | 7/2019 | Eckle | B60L 5/36 |

FOREIGN PATENT DOCUMENTS

| | | |
|---|---|---|
| DE | 10219452 A1 | 2/2004 |
| DE | 102004008571 A1 | 10/2005 |
| DE | 102009004782 A1 | 7/2010 |
| DE | 102011119351 A1 | 10/2012 |
| DE | 102012002085 A1 | 8/2013 |
| DE | 202014102490 U1 | 9/2015 |
| WO | 2015140036 A1 | 9/2015 |

OTHER PUBLICATIONS

English translation of International Preliminary Report on Patentability dated Nov. 6, 2018 for International Application No. PCT/EP2017/055586 filed Mar. 9, 2017.

English translation of Written Opinion dated May 23, 2017 for International Application No. PCT/EP2017/055586 filed Mar. 9, 2017.

International Search Report with Written Opinion dated May 16, 2017 for International Application No. PCT/EP2017/055586 filed Mar. 9, 2017.

Result of examination report of German Priority Application No. 10 2016 108 442.5 filed May 6, 2016.

Chinese Examiner's letter with English translation for Chinese Patent Application No. 201780000989.8 dated Oct. 22, 2019, 20 pages.

Chinese Patent Application No. 201780000989.8 dated Jan. 19, 2020, English translation.

* cited by examiner

DATA TRANSMISSION DEVICE, CONDUCTOR RAIL AND CONDUCTOR RAIL SYSTEM

FIELD OF THE INVENTION

The present invention relates to a data transmission device, a conductor rail, and a conductor rail system.

BACKGROUND OF THE INVENTION

In conventionally known conductor rail systems, a mobile electrical load moves along a conductor rail. To supply the load with electrical power, the load comprises a current collector, the sliding contacts of which engage conductor strands extending along the conductor rail. The load can be, e.g., a suspension structure of an overhead track conveyor, a cable trolley running on tracks or a so-called E-RTG container crane which is equipped with an electric drive which is supplied with electrical power by the conductor rail.

In order to be able to transmit data, e.g., control data, to the load, the conventionally known conductor rail systems use, inter alia, slotted hollow conductors, which run parallel to the conductor strands of the conductor rail and which engage the antennas disposed on the load.

This type of conductor rail system is disclosed in DE 10 2011 119 351 A1, wherein current-carrying conductor strands, the openings of which are pointing laterally outwardly, are laterally disposed on a double T-carrier. Also disposed thereon is a slotted hollow conductor, the longitudinal slot of which points laterally outwardly, thereby allowing dirt and, in particular, rainwater to penetrate relatively easily the longitudinal slot from the outside and to be deposited especially on the lower horizontal face of the slot.

In the slotted hollow conductor disclosed in DE 10 2012 002 085 A1, the longitudinal slot also faces outwardly. However, in order to prevent especially rainwater from penetrating the longitudinal slot diagonally from the top, in this case, a deflector component angled twice by 45° is disposed on the upper wall of the longitudinal slot, which causes the longitudinal slot following the deflector component to be directed vertically downwardly. The antenna of the track vehicle engages the longitudinal slot vertically from below, thereby causing the electromagnetic waves to be deflected from the T-shaped hollow profile of the slotted hollow conductor downwardly to the longitudinal slot by means of the deflector component. Because of the asymmetry of the angled longitudinal slot and because of the longer transmission path of the waves, this has a negative effect on the data transmission when compared with a straight-line longitudinal slot.

This disadvantage is avoided with the carrier track disclosed in DE 10 2004 008 571 A1, which carrier track is designed in the form of a double T-carrier and which has laterally disposed conductor strands, in that a slotted hollow conductor is disposed in the base portion of the double T-carrier and the longitudinal slot of the slotted hollow conductor discharges vertically downwardly. However, dirt clinging to the antenna and dirt stirred up from below, which is a problem especially encountered with E-RTG container cranes, continues to pass unhindered through the longitudinal slot into the slotted hollow conductor. Since such E-RTG container cranes are especially used in ports where the air is humid and salty, the rising moisture also passes unhindered into the slotted hollow conductor, where, primarily due to the moisture precipitating on the inside walls of the slotted hollow conductors, it causes rapid corrosion and interferes with the data transmission.

In DE 25 559 09 A1, the problem of dirt penetrating equipment for data transmission with mobile objects, which move along a predefined travel path, is solved by a conductor configuration which extends substantially parallel relative to the travel path and which carries an electromagnetic wave and by a coupling member electromagnetically coupled to the conductor configuration and attached to the mobile object, with the conductor configuration being a longitudinally slotted, rectangular hollow conductor, and with the coupling member dipping into the longitudinal slot of the hollow conductor, and with the edge of the longitudinal slot having an upward bend in that a U-shaped plastic profile projects into the hollow conductor which is furthermore completely packed with a foamed material having a low dielectric constant and low losses. For production engineering reasons, this entails a disadvantage since additional labor is required to pack the hollow conductor with foam and to fit the U-shaped profile to the foam packing.

DE 20 2014 102 490 U1 solves the problem of how to prevent the entry of debris caused by rain, dust and other external influences, in that in a conductor rail for supplying at least one electrical load which can be moved in the longitudinal direction along the conductor rail [sic; missing subject and verb; possibly, said conductor rail is equipped] with at least one conductor strand extending in the longitudinal direction and having an electrically conducting conductor profile for contacting a sliding contact of a current collector of the load and with at least one longitudinal slotted hollow conductor extending in the longitudinal direction and having a longitudinal slot for receiving an antenna which moves with the load, with the longitudinal slot being tilted about the longitudinal direction by an angle not equal to 90° relative to a travel plane in which the current collector moves in the longitudinal direction, in that an upper wall of the slot of the tilted longitudinal slot and a downwardly angled and lengthened wall disposed on said wall are provided.

DE 10 2009 004 782 A1 discloses a device for non-contact power transmission, in which the primary conductor is disposed in a channel-shaped receiving portion of a carrier element which functions as an electromagnetic shield and the receiving portion is closed by a flexible region of the electromagnetic shield so as to form a Faraday cage, through which a coupling member for inductively coupling a mobile unit to the primary conductor extends, with the mobile unit being able to move along a travel path. To improve the EMC properties of the device for non-contact power transmission, the circumference of the primary conductor is surrounded by an electromagnetic shield, by means of which the primary conductor is electromagnetically shielded toward the outside, with the electromagnetic shield having a flexible region which extends along at least one section of the travel path, and with the coupling member in the operating position extending through the flexible region in a partial region of the flexible region, with the flexible region in the partial region being adjusted to the coupling member in such a manner that the primary conductor is also shielded in the partial region by the shield toward the outside, with the coupling member in the operating position being able to travel with the mobile unit along the section of the travel path.

Similar problems also arise with other data transmission devices in which a transmitter and/or receiver unit and a data transmission device are moving relative to each other, and the transmitter and/or receiver unit is completely or partially engaged in a longitudinal slot of a hollow space of the data transmission devices.

SUMMARY OF THE INVENTION

A data transmission device, a conductor rail and a conductor rail system, which address the disadvantages discussed above and which make possible the transmission of data that is protected against the penetration of dirt and moisture into the hollow space of the hollow profile are disclosed.

Further advanced modifications and embodiments of the invention are also disclosed.

A data transmission device according to the present invention is characterized in that at least one sealing element extending along the hollow profile is provided so as to seal at least one part of the hollow space. The sealing element preferably provides a seal against the external environment so that external environmental influences, such as moisture, dust and dirt, cannot enter the hollow space through the longitudinal slot.

The longitudinal hollow profile can preferably be a slotted hollow conductor and the transmission unit can be an antenna.

The sealing element can preferably cover the entire width of the longitudinal slot. The sealing element can be attached to one side of the longitudinal slot and rest in sealed fashion against the other side of the longitudinal slot. As an alternative or in addition thereto, a sealing element can be disposed on the hollow profile on oppositely lying sides of the longitudinal slot, with free ends of the sealing elements projecting into or beyond the longitudinal slot preferably making sealing contact with one another. Advantageously, the sealing element or elements can be inclined obliquely outwardly away from the hollow space or alternatively into the hollow space or toward the hollow space. As an extension of, and especially parallel to, the slot walls of the longitudinal slot, the sealing element or the sealing elements can preferably extend into the hollow space.

In an advantageous embodiment, the sealing element can extend from one side of the longitudinal slot into the hollow space and toward the other side of the longitudinal slot, thereby ensuring that a transmission unit projecting into the longitudinal slot is completely surrounded by the sealing element and that the remaining part of the hollow space is completely sealed off from the external environment. In this case, the sealing element can project at least as far into the hollow space as the transmission unit projects a maximum distance into the longitudinal slot.

In an advantageous refinement, the sealing elements can rest against a wall of the hollow space opposite to the longitudinal slot.

The sealing element or the sealing elements can preferably be disposed in the transitional region between the hollow space and the longitudinal slot, thereby optimally shielding the hollow space against the external environment. To this end, it can be useful to provide retaining grooves for receiving the free ends of the sealing elements on the oppositely lying wall of the hollow space.

In another embodiment, the sealing element or the sealing elements can be disposed at the inlet of the longitudinal slot, thereby also sealing off the longitudinal slot from the external environment.

The sealing element or the sealing elements can preferably be configured in the form of sealing lips or brush seals. According to an embodiment that is useful from a production engineering point of view, the sealing element can have a mounting edge with an intermittently thickened cross section for retention in a complementarily shaped mounting groove of the hollow profile. The cross section of the thickened mounting edge can be circular, oval, dove-tailed, funnel-shaped or wedge-shaped.

With a conductor rail according to the present invention, a data transmission device as described above and in greater detail below is used.

A conductor rail system according to the present invention with a conductor rail as described above and in greater detail below comprises at least one electrical load which can move in the longitudinal direction of the conductor rail and which has a current collector with at least one sliding contact for contacting at least one electrically conducting conductor profile of the conductor rail, with the load comprising a transmission unit for transmitting data by means of the data transmission device of the conductor rail. Preferably, the transmission unit can engage the longitudinal slot of the hollow profile.

BRIEF DESCRIPTION OF THE DRAWINGS

The invention will be described below, using detailed implementation examples with reference to the appended drawings. As can be seen, the drawings show.

DETAILED DESCRIPTION OF THE INVENTION

Figure 1:
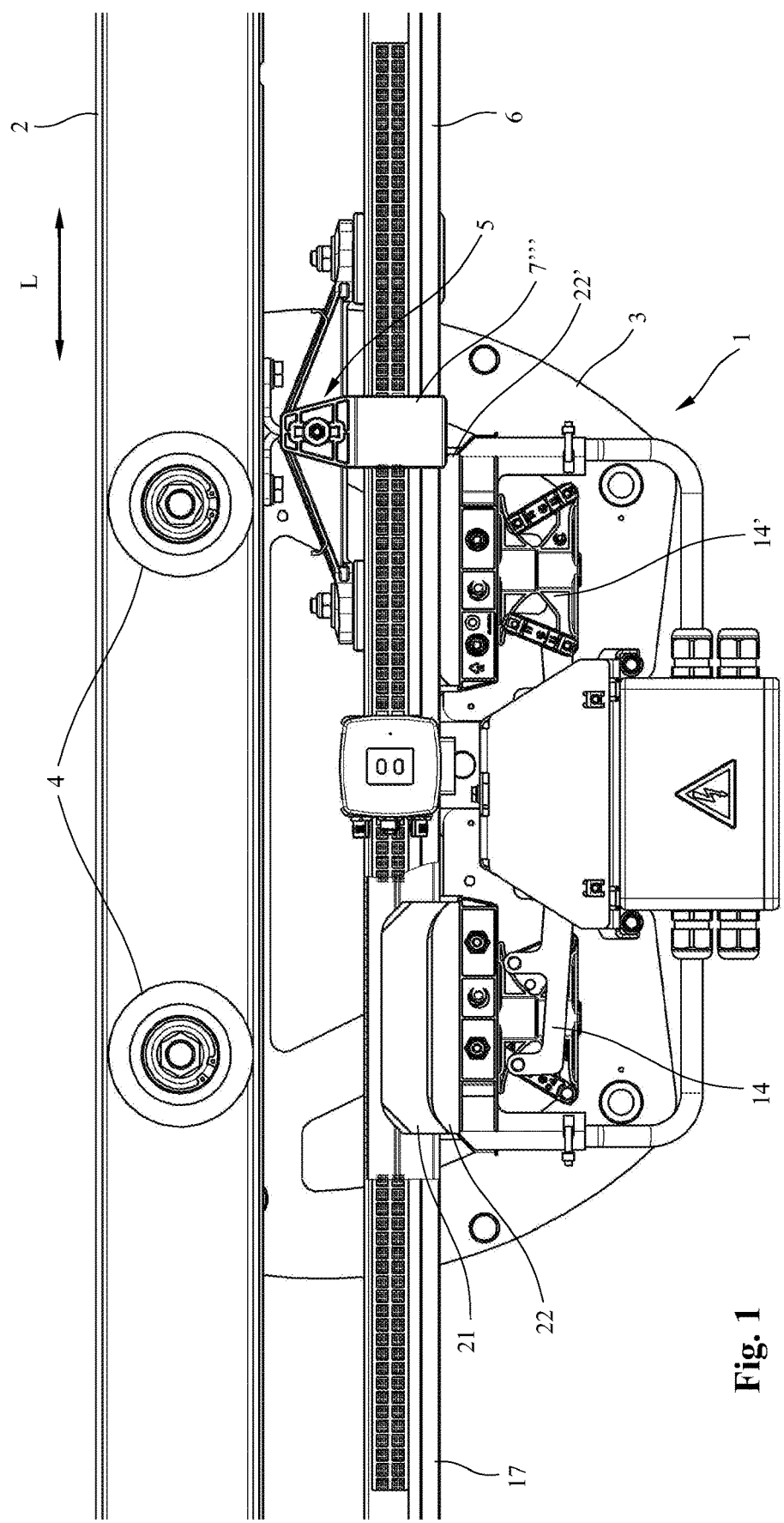
FIG. 1 a lateral partially sectioned plan view of a segment of a conductor rail system according to the present invention.

FIG. 1 shows a lateral plan view of a segment of a conductor rail system 1 according to the present invention with a substantially double U-shaped track section 2. Along the track section 2, a current collector 3 of an electrical load (not shown) can be moved in a longitudinal direction L by means of track rollers 4. The current collector 3 serves to source current to the electrical load, for example, a container crane, which moves along the track section 2.

On the lower face of the track section 2, a conductor rail 6 according to the present invention is suspended by means of conductor rail holders 5, which are attached so as to be spaced apart in the longitudinal direction L of the track section 2. The conductor rail 6 comprises three conductor strand holders 7, 7', 7" disposed side by side and easily visible in FIG. 2 for holding elongated phase conductor strands 8, 8' and 8". Since the phase conductor strands 8' and 8" have a design identical to that of the phase conductor 8, the explanations given for the phase conductor strands 8 apply mutatis mutandis.

The phase conductor strands 8 has an elongated insulating profile 9, which is held by the conductor strand holder 7. In turn, an elongated electrically conducting phase conductor profile 10 with an electrically conducting elongated sliding surface 11, preferably made of aluminum or steel, is inserted into the insulating profile 9.

A sliding contact 12 disposed on a sliding contact carrier 13 of the current collector 3 slides on the sliding surface 11. The sliding contact carrier 13 with the sliding contact 12 can be moved in a manner known in the art in the direction of and away from the sliding surface 11 by means of a feed mechanism 14 known in the art and shown by way of example in FIG. 1. During operation, the sliding contact 12 is continuously pressed against the sliding surface 11, for example, by spring action. Other sliding contacts 12' and 12" shown in FIG. 2, with their associated sliding contact carriers, are largely identical to the sliding contact 12 and the sliding contact carrier 13, so that the explanations given apply mutatis mutandis. Specifically, each sliding contact 12, 12' and 12" has its own feed mechanism 14.

The phase conductor 8 serves to supply the mobile load with power and carries voltage during standard operating conditions, which means that current flows across the sliding surface 11 to the sliding contact 12. The embodiment described above is known to those skilled in the art and therefore does not require further explanations.

In addition, this type of conductor rail system 1 generally comprises a ground conductor strand 15 so as to be able to connect the mobile load to the ground potential of the conductor rail system 1. The ground conductor strand 15 will be described below with special reference to the detail drawing in FIG. 2a.

Figure 2A:
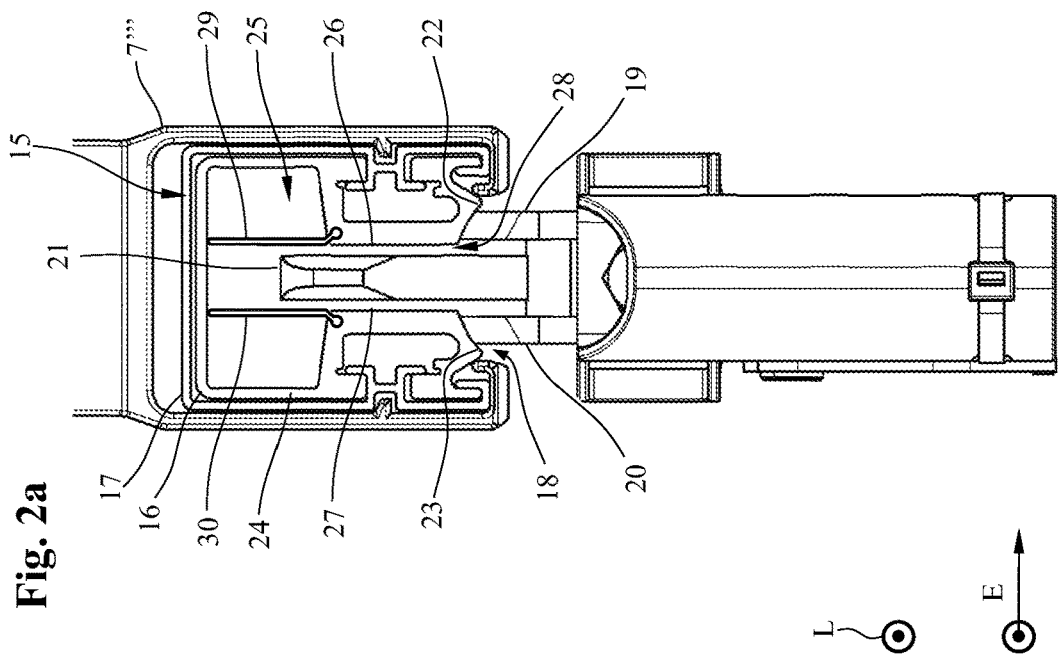
FIG. 2a a detail view from FIG. 2.
Figure 2:
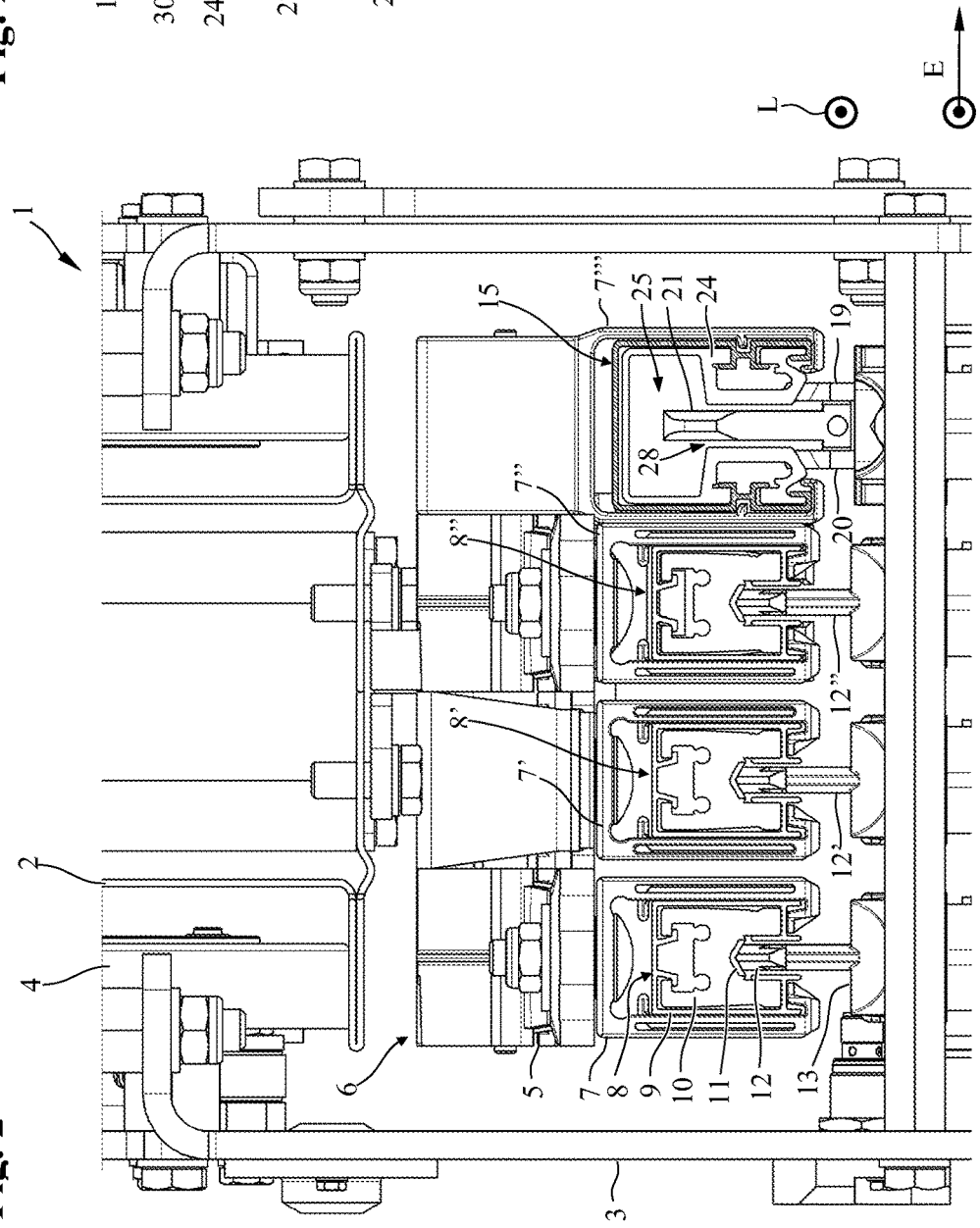
FIG. 2 a front sectional plan view of the conductor rail system shown in FIG. 1.

To this end, the ground conductor strand 15 has an electrically conducting ground conductor profile 16, which is surrounded by a substantially U-shaped ground insulating profile 17 with a contact opening 18, which in FIG. 2a is downwardly open. Like the phase conductor strands 8, 8', 8", the ground conductor strand 15 is attached to the conductor rail 6 by means of a conductor strand holder 7'". As is readily visible in FIGS. 1 to 2a, the current collector 3 has a right ground sliding contact 19 and a left ground sliding contact 20 as well as an antenna 21 disposed in between and being electrically insulated from the ground sliding contacts 19, 20, with the antenna 21 being a transmission unit. The antenna 21 and the ground sliding contacts 19, 20 can be lifted by the feed mechanism 14 and thereby made to contact, and remain in contact with, the associated ground sliding contact surfaces 22 and 23 of the ground conductor profile 16, as already described above.

At the same time, the ground conductor profile 16 forms a data transmission device with a hollow profile which is configured as a substantially T-shaped slotted hollow conductor 24. The slotted hollow conductor 24 has a hollow space 25 which merges into a right and left slot wall 26, 27 of a longitudinal slot 28, which in the drawings is shown to be downwardly open.

The longitudinal slot 28 points in the same direction as the downwardly open contact opening 18. By way of the longitudinal slot 28, the antenna 21, which is aligned in the longitudinal direction L, can engage the hollow space 25 of the slotted hollow conductor 24 so as to make possible a non-contact data transmission as known in the art.

Since under standard operating conditions, no electrical power is transmitted by the ground sliding contacts 22, 23, there is no risk that arc-overs between the ground conductor profile 16 and the ground sliding contacts 22, 23 will occur, which would have a negative influence on the data transmission via the slotted hollow conductor 24 and the antenna 21. Nonetheless, if higher currents were to flow, this would have to be considered an emergency which requires the immediate shutdown of the conductor rail system 1.

In the case at hand, the ground conductor profile 16 and the slotted hollow conductor 24 are integrally formed in one piece from the same material and thus form a single structural unit, which makes it possible to simplify the manufacturing and installation process. However, the ground conductor profile 16 and the slotted hollow conductor 21 can be produced as separate components and/or from different materials. Furthermore, the slotted hollow conductor 24 can also have another suitable cross section.

Figure 3:
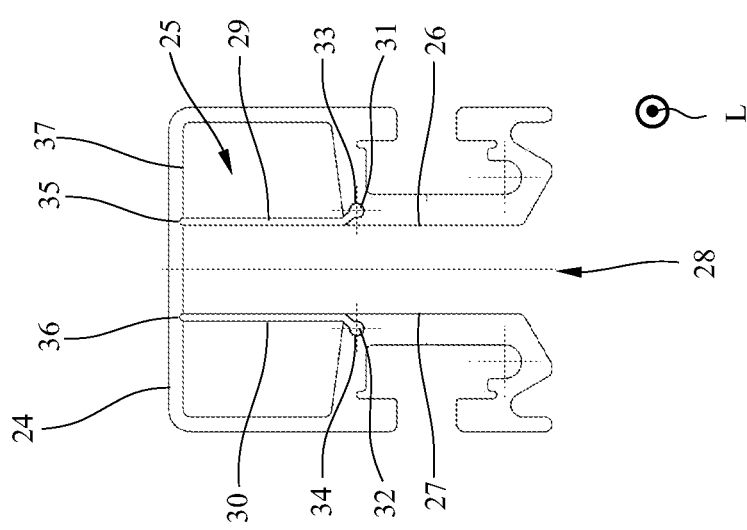
FIG. 3 a sectional view through a first embodiment of a data transmission device of the conductor rail system according to the present invention of FIG. 1.

As illustrated by the configuration of the slotted hollow conductor 24 shown in FIG. 2a and in greater detail in FIG. 3, to prevent dirt and moisture from penetrating and accumulating in the hollow space 25, two sealing strips 29, 30 with thickened mounting edges 31, 32, the cross section of which is circular, are mounted in complementarily shaped circular right and left mounting grooves 33, 34 on the side of the hollow space at the inside end of the slot walls 26, 27 of the longitudinal slot 28. Because of these thickened mounting edges 31, 32, it is possible easily to insert the sealing strips 29, 30 into the mounting groove 33, 34 and at the same time securely retain them therein.

With production engineering advantages in mind, the two mounting grooves 33, 34 are cut into the slotted hollow conductor 24 so as to pass obliquely from the edge between the walls 26, 27 of the slot and the adjoining walls of the hollow space 25. A short distance downstream of their thickened mounting edges 31, 32, the sealing strips 29, 30 bend in such a way that they project in parallel and as an extension of the slot walls 26, 27 into the hollow space 25 and extend to an opposite upper wall 37 of the slotted hollow conductor 24.

As a result, the free front ends of the sealing strips 29, 30 come to rest in the retaining grooves 35, 36 in the upper wall 37, thereby additionally stabilizing their straight-line course and improving their sealing function. Optionally, however, the free ends of the sealing strips 29, 30 can simply rest against the upper wall 37, with no retaining grooves 35, 36 provided therein.

Figure 4:
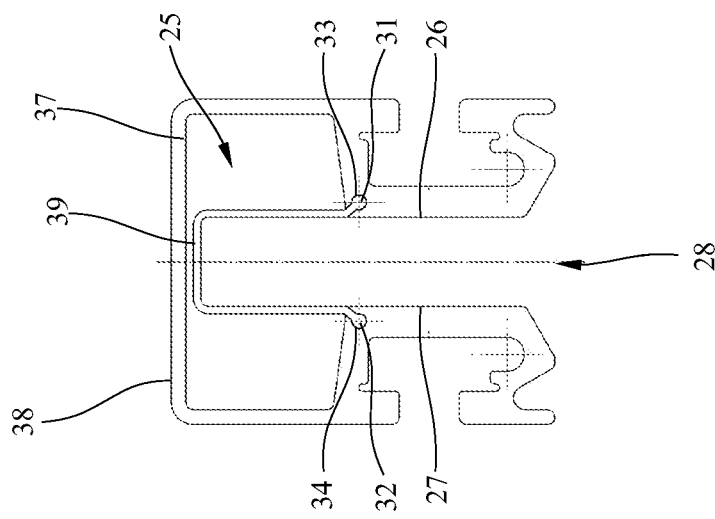
FIG. 4 a sectional view through a second embodiment of a data transmission device of the conductor rail system according to the present invention of FIG. 1.

The alternative embodiment of a data transmission device in the form of a slotted hollow conductor 38 shown in FIG. 4 substantially differs from the embodiment shown in FIG. 3 in that the sealing element has a different design. Components having identical functions are therefore identified by identical reference characters and the explanations given above apply mutatis mutandis.

Thus, instead of the two separate sealing strips 29, 30 shown in FIG. 3, the slotted hollow conductor 38 has only one elongated, uninterrupted, trough-shaped sealing element 39. With one of its thickened mounting edge 31, the sealing element 39 is mounted in the right mounting groove 33, as illustrated in the embodiment shown in FIGS. 2a and 3. Subsequently, the sealing element 39 first projects parallel to and as an extension of the right slot wall 26 into the hollow space 25 and extends to the opposite upper wall 37 of the slotted hollow conductor 38, then bends at right angles in the direction of the other slot wall 27 and extends parallel to the upper wall 37. At the level of the left slot wall 27, the sealing element 37 subsequently again bends substantially at right angles and projects into the hollow space 25 so that the sealing element 39 extends parallel to and as an extension of the left slot wall 27 toward said wall. On this side, the sealing element 39 is subsequently again mounted with its thickened mounting edge 32 in the mounting groove 34, as described above. To prevent the front face of the antenna 21 facing in the direction of the upper wall 37 from striking the sealing element 39, it may be useful for the sealing element 39 to project slightly farther into the hollow space 25 than the antenna 21.

The trough-shaped sealing element 39 is preferably made of a dimensionally stable, relatively elastic and electrically non-conducting material, such has hard rubber, plastic or another synthetic material.

Optionally, the spacing between the sealing strips 29, 30 and the associated opposite components of the trough-shaped sealing element 39 can become narrower in the direction of the upper wall 37. Preferably, this spacing is at least slightly greater than the width of the antenna 21 so as to not restrict its mobility both when retracting and extending said antenna and when making it travel in the longitudinal direction L.

Figure 5:
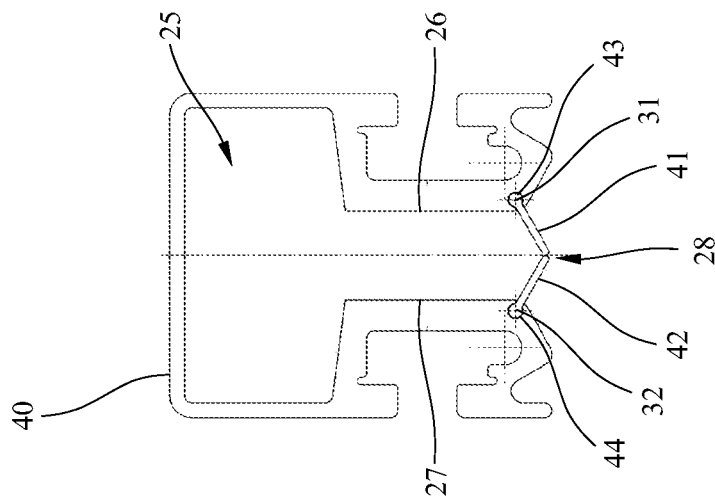
FIG. 5 a sectional view through a third embodiment of a data transmission device of the conductor rail system according to the present invention of FIG. 1

The alternative embodiment of a data transmission device in the form of a slotted hollow conductor 38 shown in FIG. 5 substantially differs from the embodiment shown in FIGS. 3 and 4 in that the sealing element has a different design. Components having identical functions are therefore identified by identical reference characters and the explanations given above apply mutatis mutandis.

Thus, instead of the sealing strips 29, 30 projecting into the hollow space as shown in FIG. 3, two sealing lips 41, 42 are disposed at the inlet of the longitudinal slot 28, which sealing lips have thickened mounting edges 31, 32, with which they are mounted in the mounting grooves 43, 44 on the slotted hollow conductor 40. The sealing lips 41, 42 point obliquely away from the hollow space 25 in the direction of the antenna 21, and their free ends preferably rest in sealed fashion against one another in the center line of the longitudinal slot 28. This is useful to ensure that dirt and moisture is prevented from entering the inlet of the longitudinal slot 28, with the antenna 21 at the same time being cleaned by the sealing lips 41, 42 as it is being inserted into the longitudinal slot 28.

The sealing strips 29, 30 and the sealing lips 41, 42 are preferably made of a dimensionally stable, relatively elastic and electrically non-conducting material, such has hard rubber or another synthetic material. Optionally, the sealing strips and the sealing lips can be made of a different material, e.g., a brush material, which, on the one hand, provides an adequate seal against dirt and moisture and, on the other hand, allows the antenna 21 to engage in the longitudinal slot 28 and does not overly hinder travel by the antenna 21 in the longitudinal direction L. For this purpose, it is known, for example, that brush seals can be used.

A method different from the above-described method of mounting the sealing strips 29, 30 of the trough-shaped element 39 or the sealing lips 41, 42 by means of the thickened mounting edges 31, 32 on the slotted hollow conductor 24, 38 and 40 can be used as long as it is ensured that the sealing elements are stably and tightly mounted on the slotted hollow conductor 24, 38 and 40.

To further increase the reliability of the conductor rail system 1, an additional antenna with lateral ground sliding contacts 22' can be disposed on an additional feed mechanism 14', such as is provided in the embodiment shown in FIG. 1. In this manner, it is possible to bridge an interruption, e.g., as a result of a thermally disconnected junction of the ground conductor profile 16, which is not made of a continuous material, and the slotted hollow conductor 24, without interruption of the data transmission.

As illustrated in the drawings, the longitudinal slot 28 can also extend in directions different from the downward direction since the sealing elements 29, 30, 39 and 41, 42 now prevent moisture and dirt from passing into the hollow space 25.

Instead of the various slotted hollow conductors 24, 38 and 40 described above, it is also possible to use a different method of data transmission, in which a transmission unit which can move relative to the hollow space and which projects at least partially into the longitudinal slot is disposed in an elongated hollow profile with a hollow space extending in a longitudinal direction of the hollow profile and a longitudinal slot extending in the longitudinal direction.

Instead of the hollow profile described above and shown in the figures, the hollow space can also have different cross sections, e.g., circular or polygonal cross sections.

REFERENCE CHARACTERS

1 Conductor rail system
2 Track section
3 Current collector
4 Track rollers
5 Conductor rail holders
6 Conductor rail
7, 7', 7" Conductor strand holders
8, 8', 8" Phase conductor strands
9 Insulating profile
10 Phase conductor profile
11 Sliding surface of the phase conductor strand
12, 12', 12" Sliding contact
13 Sliding contact carrier
14 Feed mechanism
15 Ground conductor strand
16 Ground conductor profile
17 Ground insulating profile
18 Contact opening in the ground insulating profile
19 Right ground sliding contact
20 Left ground sliding contact
21 Antenna
22 Right ground sliding contact surface
23 Left ground sliding contact surface
24 Slotted hollow conductor
25 Hollow space in the slotted hollow conductor
26 Right wall of the slot
27 Left wall of the slot
28 Longitudinal slot
29 Right sealing strip
30 Left sealing strip
31 Right thickened mounting edge
32 Left thickened mounting edge
33 Right mounting groove
34 Left mounting groove
35 Right retaining groove for the sealing strip
36 Left retaining groove for the sealing strip
37 Upper wall of the slotted hollow conductor
38 Alternative slotted hollow conductor
39 Trough-shaped sealing element
40 Alternative slotted hollow conductor
41 Right sealing lip
42 Left sealing lip
43 Right mounting groove for the sealing lip
44 Left mounting groove for the sealing lip
L Longitudinal direction of the conductor rail

The invention claimed is:

1. A data transmission device with an elongated hollow profile with a hollow space extending in a longitudinal direction of the hollow profile, with the hollow profile having a longitudinal slot extending in the longitudinal direction for a transmission unit which moves relative to the hollow space at least in the longitudinal direction and which extends at least partially into the longitudinal slot,
- wherein the elongated hollow profile is a slotted hollow conductor and the transmission unit is an antenna,
- wherein at least one sealing element extends along the hollow profile for sealing off at least a portion of the hollow space, and
- wherein the at least one sealing element projects from one side of the longitudinal slot into the hollow space and extends to the other side of the longitudinal slot; or wherein the at least one sealing element abuts a wall of the hollow space that lies opposite to the longitudinal slot.

2. The data transmission device according to claim 1, wherein the at least one sealing element covers the entire width of the longitudinal slot.

3. The data transmission device according to claim 2, wherein the at least one sealing element is attached to one side of the longitudinal slot and rests in sealed fashion on the other side of the longitudinal slot.

4. The data transmission device according to claim 1, wherein the at least one sealing element is disposed on the hollow profile on oppositely lying sides of the longitudinal slot.

5. The data transmission device according to claim 1, wherein the at least one sealing element is directed into the hollow space.

6. The data transmission device according to claim 5, wherein the longitudinal slot has slot walls and wherein the at least one sealing element is an extension of the slot walls projecting into the hollow space.

7. The data transmission device according to claim 6, wherein the at least one sealing element projects from one side of the longitudinal slot into the hollow space and extends to the other side of the longitudinal slot.

8. The data transmission device according to claim 7, wherein the at least one sealing element projects at least as far into the hollow space as the transmission unit projects a maximum distance into the longitudinal slot.

9. The data transmission device according to claim 5, wherein the at least one sealing element abuts the wall of the hollow space that lies opposite to the longitudinal slot.

10. The data transmission device according to claim 1, wherein the at least one sealing element is disposed in a transitional region between the hollow space and the longitudinal slot.

11. The data transmission device according to claim 10, wherein a retaining groove for receiving a free end of the at least one sealing element is provided on the oppositely lying wall of the hollow space.

12. The data transmission device according to claim 1, wherein the at least one sealing element has a mounting edge with an intermittently thickened cross section for retention in a complementarily shaped mounting groove of the hollow profile.

13. The data transmission device according to claim 12, wherein the cross section of the thickened mounting edge is circular, oval, dove-tailed, funnel-shaped or wedge-shaped.

14. A conductor rail for supplying at least one electrical load with electrical power, which load can be moved in the longitudinal direction along the conductor rail, with at least one conductor strand extending in the longitudinal direction with an electrically conducting conductor profile for contacting a sliding contact of the load and with the data transmission device of claim 1 extending in the longitudinal direction.

15. A conductor rail system with a conductor rail according to claim 14, with at least one electrical load which can move in the longitudinal direction of the conductor rail and which has a current collector with at least one sliding contact for contacting at least one electrically conducting conductor profile of the conductor rail, and which comprises a transmission unit for the transmission of data by the data transmission device of the conductor rail.

16. The conductor rail system according to claim 15, wherein the transmission unit at least partially engages the longitudinal slot of the hollow profile.

17. A data transmission device with an elongated hollow profile with a hollow space extending in a longitudinal direction of the hollow profile, with the hollow profile having a longitudinal slot extending in the longitudinal direction for a transmission unit which moves relative to the hollow space at least in the longitudinal direction and which extends at least partially into the longitudinal slot, wherein the elongated hollow profile is a slotted hollow conductor and the transmission unit is an antenna, wherein at least one sealing element extends along the hollow profile for sealing off at least a portion of the hollow space, wherein the at least one sealing element is directed into the hollow space, and wherein the at least one sealing element abuts a wall of the hollow space that lies opposite to the longitudinal slot.

18. A data transmission device with an elongated hollow profile with a hollow space extending in a longitudinal direction of the hollow profile, with the hollow profile having a longitudinal slot extending in the longitudinal direction for a transmission unit which moves relative to the hollow space at least in the longitudinal direction and which extends at least partially into the longitudinal slot,
- wherein at least one sealing element extends along the hollow profile for sealing off at least a portion of the hollow space,
- wherein the at least one sealing element is disposed in a transitional region between the hollow space and the longitudinal slot, and
- wherein a retaining groove for receiving a free end of the at least one sealing element is provided on the oppositely lying wall of the hollow space.

* * * * *